(12) United States Patent
Hoelzl

(10) Patent No.: US 12,196,184 B2
(45) Date of Patent: Jan. 14, 2025

(54) NACELLE FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 294 days.

(21) Appl. No.: 17/295,174

(22) PCT Filed: Dec. 9, 2019

(86) PCT No.: PCT/AT2019/060424
§ 371 (c)(1),
(2) Date: May 19, 2021

(87) PCT Pub. No.: WO2020/118332
PCT Pub. Date: Jun. 18, 2020

(65) Prior Publication Data
US 2021/0388820 A1    Dec. 16, 2021

(30) Foreign Application Priority Data
Dec. 13, 2018    (AT) .............................. A 51112/2018

(51) Int. Cl.
*F03D 80/70*       (2016.01)
*F16C 17/10*       (2006.01)
(Continued)

(52) U.S. Cl.
CPC ............ *F03D 80/70* (2016.05); *F16C 17/105* (2013.01); *F16C 33/1045* (2013.01);
(Continued)

(58) Field of Classification Search
CPC ........ F16C 33/74; F16C 17/105; F16C 35/02; F16C 33/1045; F16C 33/1085; F03D 80/70
See application file for complete search history.

(56) References Cited

U.S. PATENT DOCUMENTS 3,203,260 A    8/1965   Pierry et al.
6,637,942 B2   10/2003  Dourlens et al.
(Continued)

FOREIGN PATENT DOCUMENTS

AT    509 625 B1    10/2011
AT    516029 A4     2/2016
(Continued)

OTHER PUBLICATIONS

International Search Report in PCT/AT2019/060420, mailed Mar. 5, 2020.
(Continued)

*Primary Examiner* — Justin D Seabe
(74) *Attorney, Agent, or Firm* — Collard & Roe, P.C.

(57) ABSTRACT

A nacelle for a wind turbine includes: a nacelle housing; a rotor hub; and a rotor bearing for bearing the rotor hub on the nacelle housing, wherein the rotor bearing has at least one inner ring element and at least one outer ring element, wherein at least one oil-lubricated sliding bearing element is formed between the inner ring element and the outer ring element. In the nacelle housing and/or in the rotor hub, a lubricating oil sump is formed in such a manner for receiving a lubricating oil for the sliding bearing element. The lubricating oil sump can be filled with lubricating oil up to a lubricating oil level, wherein at least a section of the rotor bearing is arranged in the lubricating oil sump vertically below the lubricating oil level.

15 Claims, 4 Drawing Sheets

Figure 1:
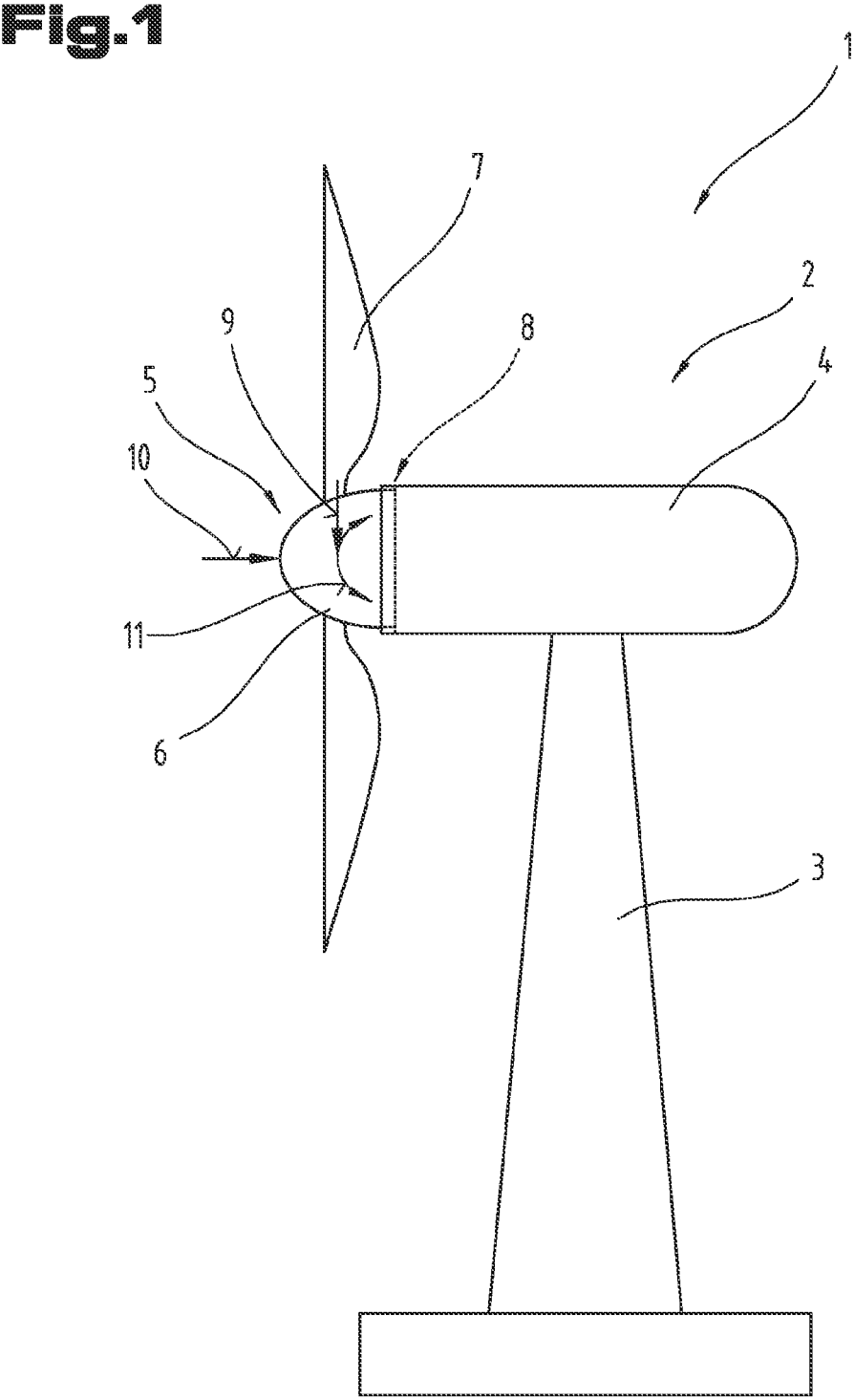

(51) Int. Cl.
  *F16C 33/10* (2006.01)
  *F16C 33/74* (2006.01)
(52) U.S. Cl.
  CPC .......... *F16C 33/1085* (2013.01); *F16C 33/74* (2013.01); *F05B 2240/50* (2013.01); *F05B 2240/57* (2013.01); *F05B 2260/98* (2013.01); *F16C 2360/31* (2013.01)

(56) References Cited

U.S. PATENT DOCUMENTS

| | | |
|---|---|---|
| 6,866,423 B2 | 3/2005 | Faltus et al. |
| 7,255,537 B2 * | 8/2007 | Flamang ................ F03D 15/10 416/170 R |
| 7,794,151 B2 | 9/2010 | Neumann |
| 7,832,980 B2 | 11/2010 | Demtroder et al. |
| 8,545,186 B2 | 10/2013 | Loeschner et al. |
| 8,591,371 B2 | 11/2013 | Dinter et al. |
| 8,840,521 B2 | 9/2014 | Kari et al. |
| 8,974,120 B2 | 3/2015 | Pedersen et al. |
| 9,057,365 B2 | 6/2015 | Han et al. |
| 9,206,787 B2 | 12/2015 | Winkelmann |
| 9,279,413 B2 | 3/2016 | Ebbesen et al. |
| 9,297,454 B2 | 3/2016 | Barthel et al. |
| 9,435,376 B2 | 9/2016 | Gaertner et al. |
| 9,458,880 B2 * | 10/2016 | Kari ................ F16C 17/10 |
| 9,657,716 B2 | 5/2017 | Vervoorn et al. |
| 9,677,606 B2 | 6/2017 | Pischel |
| 9,683,602 B2 | 6/2017 | Hager et al. |
| 9,784,245 B2 | 10/2017 | Hager et al. |
| 9,845,826 B2 | 12/2017 | Sutton et al. |
| 9,869,349 B2 | 1/2018 | Rittmann et al. |
| 9,995,283 B2 | 6/2018 | Stiesdal |
| 10,072,704 B2 | 9/2018 | Sato et al. |
| 10,288,164 B2 | 5/2019 | Hoelzl |
| 10,436,249 B2 | 10/2019 | Hoelzl |
| 10,451,176 B2 | 10/2019 | Hoelzl |
| 10,502,259 B2 | 12/2019 | Meyer |
| 10,598,214 B2 | 3/2020 | Hoelzl |
| 10,612,586 B2 | 4/2020 | Frydendal et al. |
| 10,724,624 B2 | 7/2020 | Tulokas |
| 11,009,077 B2 | 5/2021 | Hofmann et al. |
| 11,280,320 B2 | 3/2022 | Claramunt Estecha et al. |
| 11,384,728 B2 | 7/2022 | Elmose |
| 2002/0114549 A1 | 8/2002 | Hokkirigawa et al. |
| 2003/0063821 A1 | 4/2003 | Dourlens et al. |
| 2005/0129341 A1 | 6/2005 | Hoppe |
| 2010/0111459 A1 | 5/2010 | Yasuda |
| 2011/0254281 A1 | 10/2011 | Noda et al. |
| 2013/0071246 A1 | 3/2013 | Kari et al. |
| 2013/0172144 A1 | 7/2013 | Suzuki et al. |
| 2014/0161614 A1 | 6/2014 | Vervoorn et al. |
| 2014/0169952 A1 | 6/2014 | Pedersen et al. |
| 2014/0193262 A1 | 7/2014 | Pedersen et al. |
| 2014/0193264 A1 | 7/2014 | Pedersen et al. |
| 2014/0377063 A1 | 12/2014 | Guerenbourg et al. |
| 2015/0017000 A1 * | 1/2015 | Sato ................ F16C 17/10 416/174 |
| 2015/0055899 A1 | 2/2015 | Kodama et al. |
| 2015/0159693 A1 | 6/2015 | Corts |
| 2015/0204383 A1 | 7/2015 | Ishii et al. |
| 2015/0330498 A1 | 11/2015 | Carlino et al. |
| 2015/0369284 A1 | 12/2015 | Hager et al. |
| 2016/0076522 A1 | 3/2016 | Rohden |
| 2016/0327148 A1 | 11/2016 | Dinter |
| 2018/0187719 A1 | 7/2018 | Tulokas |
| 2020/0158090 A1 | 5/2020 | Hager et al. |
| 2020/0173425 A1 | 6/2020 | Schroeder |

FOREIGN PATENT DOCUMENTS

| | | |
|---|---|---|
| AT | 519288 A1 | 5/2018 |
| AT | 15975 U1 | 10/2018 |
| AU | 650057 B2 | 3/1992 |
| AU | 2008331343 A1 | 2/2010 |
| CN | 101438068 A | 5/2009 |
| CN | 101965455 A | 2/2011 |
| CN | 102009663 A | 4/2011 |
| CN | 202082374 U | 12/2011 |
| CN | 102345676 A | 2/2012 |
| CN | 102418833 A | 4/2012 |
| CN | 102713276 A | 10/2012 |
| CN | 202811230 U | 3/2013 |
| CN | 103557124 A | 2/2014 |
| CN | 103765005 A | 4/2014 |
| CN | 104234949 A | 12/2014 |
| CN | 104819209 A | 8/2015 |
| CN | 104956101 A | 9/2015 |
| CN | 204627877 U | 9/2015 |
| CN | 106062391 A | 10/2016 |
| CN | 106164509 A | 11/2016 |
| CN | 106884972 A | 6/2017 |
| CN | 108026975 A1 | 5/2018 |
| CN | 108167442 A1 | 6/2018 |
| CN | 108884863 A | 11/2018 |
| DE | 37 02 008 A1 | 8/1988 |
| DE | 3726751 A1 | 2/1989 |
| DE | 10064261 A1 | 7/2002 |
| DE | 10 2005 001 344 A1 | 7/2006 |
| DE | 10 2005 018 836 B3 | 12/2006 |
| DE | 60219261 T2 | 1/2008 |
| DE | 10 2011 010 204 A1 | 8/2012 |
| DE | 10 2011 119 471 A | 5/2013 |
| DE | 10 2012 212 792 A1 | 1/2014 |
| DE | 10 2013 211 710 B3 | 10/2014 |
| DE | 10 2014 205 637 A1 | 10/2015 |
| DE | 10 2015 201 356 A1 | 7/2016 |
| DE | 11 2013 003 034 B4 | 8/2017 |
| DK | 201670106 A1 | 9/2017 |
| EP | 1 564 406 A1 | 8/2005 |
| EP | 1 564 406 A2 | 8/2005 |
| EP | 2 003 334 A1 | 12/2008 |
| EP | 2 136 093 A1 | 12/2009 |
| EP | 2290269 A1 | 3/2011 |
| EP | 2 383 480 B1 | 10/2012 |
| EP | 2 568 163 A1 | 3/2013 |
| EP | 2 597 307 A2 | 5/2013 |
| EP | 2 600 037 A1 | 6/2013 |
| EP | 2 657 519 A1 | 10/2013 |
| EP | 2 679 492 A1 | 1/2014 |
| EP | 2 711 568 A1 | 3/2014 |
| EP | 2816226 A1 | 12/2014 |
| EP | 2 863 076 A1 | 4/2015 |
| EP | 2 955 413 A1 | 12/2015 |
| EP | 3 012 479 A1 | 4/2016 |
| EP | 3 040 553 A1 | 7/2016 |
| EP | 3091242 A1 | 11/2016 |
| EP | 3 139 034 A1 | 3/2017 |
| EP | 3 173 642 A1 | 5/2017 |
| EP | 3 252 306 A1 | 6/2017 |
| EP | 3 279 471 A1 | 2/2018 |
| EP | 3 343 071 A1 | 7/2018 |
| EP | 3 396 187 A1 | 10/2018 |
| GB | 1405118 A | 9/1975 |
| GB | 2 201 200 B | 8/1990 |
| JP | S59-54812 A | 3/1984 |
| JP | H04-203566 A | 7/1992 |
| JP | H07-3248 B2 | 1/1995 |
| JP | H07-293556 A | 11/1995 |
| JP | H11-303857 A | 11/1999 |
| JP | 2002-195261 A1 | 7/2002 |
| JP | 2003176822 A | 6/2003 |
| JP | 2003194071 A | 7/2003 |
| JP | 2006-118552 A | 5/2006 |
| JP | 2010-101263 A | 5/2010 |
| JP | 2010151207 A | 7/2010 |
| JP | 2014-159861 A | 9/2014 |
| JP | 2015-001279 A | 1/2015 |
| JP | 2017-048849 A | 3/2017 |
| KR | 2014-0143620 A | 12/2014 |
| WO | 2007/071239 A1 | 6/2007 |
| WO | 2008152083 A1 | 12/2008 |
| WO | 2011/127509 A1 | 10/2011 |
| WO | 2011/127510 A1 | 10/2011 |

(56) References Cited

FOREIGN PATENT DOCUMENTS

| WO | 2012/103913 A1 | 8/2012 |
| WO | 2013/191163 A1 | 12/2013 |
| WO | 2014/005587 A1 | 1/2014 |
| WO | 2014/117196 A1 | 8/2014 |
| WO | 2014/173808 A1 | 10/2014 |
| WO | 2017/144058 A1 | 8/2017 |
| WO | 2018/071941 A1 | 4/2018 |

OTHER PUBLICATIONS

International Search Report in PCT/AT2019/060424, mailed Apr. 3, 2020.
International Search Report in PCT/AT2019/060425, mailed Apr. 14, 2020.
International Search Report in PCT/AT2019/060421, mailed Apr. 3, 2020.
International Search Report in PCT/AT2019/060426, mailed Apr. 7, 2020.
International Search Report in PCT/AT2019/060419, mailed Mar. 26, 2020.
Li Yunlong, Discussion on Localization of Composite Material Sliding Bearing in Hydropower Projects, Hongshui River, vol. 35, Issue 2, 4 pages, with English Abstract at the end of the document, Apr. 2016.

* cited by examiner

NACELLE FOR A WIND TURBINE

CROSS REFERENCE TO RELATED APPLICATIONS

This application is the National Stage of PCT/AT2019/060424 filed on Dec. 9, 2019 which claims priority under 35 U.S.C. § 119 of Austrian Application No. A 51112/2018 filed on Dec. 13, 2018, the disclosure of which is incorporated by reference. The international application under PCT article 21 (2) was not published in English.

The invention relates to a nacelle for a wind turbine as well as to a wind turbine equipped with a nacelle.

From EP2863076A1, a rotor bearing for a nacelle of a wind turbine is known. The rotor bearing known from EP2863076A1 has only a low energy efficiency.

It was the object of the present invention to overcome the disadvantages of the prior art and to provide a nacelle for a wind turbine with improved energy efficiency.

This object is achieved by means of a nacelle and a wind turbine according to the claims.

According to the invention, a nacelle for a wind turbine is provided. The nacelle comprises:
 a nacelle housing;
 a rotor hub;
 a rotor bearing for bearing the rotor hub on the nacelle housing, wherein the rotor bearing has at least one inner ring element and at least one outer ring element, wherein at least one oil-lubricated sliding bearing element is formed between the inner ring element and the outer ring element. In the nacelle housing and/or in the rotor hub, a lubricating oil sump for receiving a lubricating oil for the sliding bearing element is designed such that the lubricating oil sump can be filled with lubricating oil up to a lubricating oil level, wherein at least a section of the rotor bearing is arranged in the lubricating oil sump vertically below the lubricating oil level.

The nacelle according to the invention entails the surprising advantage that due to the design according to the invention, an improvement of the nacelle's energy efficiency can be achieved. The improved energy efficiency of the nacelle can be achieved in particular by parts of the rotor bearing being immersed in the lubricating oil sump, whereby a hydrodynamic lubrication of the rotor bearing can be realized, in which no additional oil pump is needed. In particular, complex aggregates such as the additional oil pump are consequently not necessary. Oil lines otherwise required for transporting lubricating oil conveyed by means of an oil pump are also not necessary in the nacelle according to the invention. This allows not only improving the energy efficiency but also reducing the complexity of the nacelle. This particularly leads to a reduction of the error-proneness of the nacelle and/or to an increase of the lifespan of the nacelle.

Moreover, it may be useful if the at least one sliding bearing element is designed as hydrodynamic sliding bearing, which can be lubricated without a pressure-increasing device.

Furthermore, it may be provided that at least one lubricating oil bore is arranged in the inner ring element and/or in the outer ring element, which lubricating oil bore opens directly into the lubricating oil sump. This entails the advantage that the lubricating oil can be fed directly from the lubricating oil sump to the sliding bearing element.

In addition to this, it may be provided that a sealing element is formed between the nacelle housing and the rotor hub and/or between the nacelle housing and a rotor shaft. By this measure, a leakage of the lubricating oil out of the interior of the nacelle can be avoided and/or reduced as much as possible.

A design according to which it may be provided that the lubricating oil sump is formed entirely inside the nacelle housing, wherein the nacelle housing is designed so as to be partible in the region of the lubricating oil sump, is also advantageous. This entails the advantage that the sealing element may be formed outside the lubricating oil sump and therefore has to have only a lesser sealing effect than if the lubricating oil sump stretches to the sealing element. Due to the partible design of the nacelle housing in the region of the lubricating oil sump, the rotor bearing can be serviced more easily and/or the assembly of the rotor bearing is facilitated.

According to an advancement, it is possible that the nacelle housing has a main part of the housing and a lubricating oil sump lid. The lubricating oil sump lid together with the main part of the housing may form the lubricating oil sump. In the assembled state, the lubricating oil sump lid forms a part of the housing. In particular, it may be provided that the lubricating oil sump lid is coupled with the main part of the housing by means of fastening means, in particular by means of screws. Moreover, it may be provided for that a sealing element is arranged between the main part of the housing and the lubricating oil sump lid.

Moreover, it may be provided that the lubricating oil sump lid is designed to be radially parted, and/or multiple lubricating oil sump lids are provided, which can be removed from the rotor shaft in a radial direction. By this measure, it may be achieved that the lubricating oil sump lid can be removed without having to take the rotor hub off the rotor shaft in the process. In particular, the maintainability of the nacelle can be improved by this.

Furthermore, it may be useful if the inner ring element is coupled with the rotor hub and if the at least one sliding bearing element is fastened to the inner ring element and is rotatable relative to the outer ring element, wherein a sliding surface is formed between the sliding bearing element and the outer ring element. In this regard, it can in particular be provided that the rotor bearing is designed such that the sliding surface is immersed in the lubricating oil sump at least in some sections. Particularly such a design of the rotor bearing entails the surprising advantage that the lubrication of the rotor bearing can be carried out particularly efficiently and thus, a nacelle designed in such a way can have a very high energy efficiency.

In addition to this, it may be provided that at least one lubricating oil bore is arranged in the outer ring element, which lubricating oil bore at a first end opens into the sliding surface and at a second end opens into the lubricating oil sump. By this measure, it can be achieved that the lubricating oil can be fed directly to the sliding surface via the lubricating oil bore, which entails a surprisingly high efficiency of the bearing.

Moreover, it may be provided that a flow channel being circumferential at least in some sections is formed in the outer ring element, which flow channel tapers off particularly in the shape of a wedge gap and into which the at least one lubricating oil bore opens. By this measure, an oil film can form easily on the sliding surface and the lubrication of the rotor bearing can thus be improved. The flow channel being circumferential at least in some sections may be formed on the inner ring element in the center of that surface, which abuts the sliding bearing element.

According to a particular design, it is possible that multiple lubricating oil bores are formed to be distributed across the circumference of the outer ring element, wherein multiple of said lubricating oil bores open into the flow channel. By this measure, it can be ensured that the flow channel can be supplied with sufficient lubricating oil.

According to an advantageous advancement, it may be provided that the lubricating oil level is selected at such a height that at their lowest-situated cross-section, the sliding surfaces of the rotor bearing are situated entirely, and therefore over their entire width, below the lubricating oil level. By this measure, it can be achieved that the sliding surfaces of the rotor bearing are supplied with sufficient lubricating oil over their entire width.

In particular, it may be advantageous if the lubricating oil level is selected at such a height that the sealing element is situated above the lubricating oil level. By this measure, a lubricating oil leakage out of the nacelle can be mostly impeded without having to provide above-average sealing measures in the process.

Furthermore, it may be provided that the sliding bearing element comprises multiple individual sliding bearing pads which are arranged distributed across the circumference. Particularly such sliding bearing pads can be installed easily and/or can be replaced during maintenance. In particular, it may be provided that the individual sliding bearing pads form a closed sliding surface when assembled, so that a uniform lubricating oil film can form in the sliding bearing.

In addition to this, it may be provided that the sliding bearing pads are each fastened to the inner ring element or outer ring element by means of at least one fastening means, in particular a screw connection. In particular in case of such a fastening of the sliding bearing pads in the sliding bearing, the maintainability of the rotor bearing can be improved.

A design according to which it may be provided that a lubricating oil sump for receiving a lubricating oil for the sliding bearing element is formed in the nacelle housing and/or in the rotor hub, wherein the lubricating oil sump is filled with lubricating oil up to a lubricating oil level, wherein at least a section of the rotor bearing is arranged in the lubricating oil sump vertically below the lubricating oil level, so that this section of the rotor bearing is immersed in the lubricating oil collected in the lubricating oil sump, is also advantageous.

Moreover, a wind turbine having a nacelle is provided according to the invention. The nacelle comprises:
a nacelle housing;
a rotor hub having rotor blades arranged thereon;
a rotor bearing for bearing the rotor hub on the nacelle housing, wherein the rotor bearing has at least one inner ring element and at least one outer ring element, wherein at least one sliding bearing element is formed between the inner ring element and the outer ring element.

A lubricating oil sump for receiving a lubricating oil for the sliding bearing element is formed in the nacelle housing and/or in the rotor hub, wherein the lubricating oil sump is filled with lubricating oil up to a lubricating oil level, wherein at least a section of the rotor bearing is arranged in the lubricating oil sump vertically below the lubricating oil level, so that this section of the rotor bearing is immersed in the lubricating oil collected in the lubricating oil sump, is also advantageous.

Moreover, it may be provided that the sliding bearing element is designed as a multi-layer sliding bearing. The multi-layer sliding bearing may consist of and/or have at least one support layer and at least one sliding layer, wherein the sliding layer has a Vickers hardness of at least 75 HV (0.001), in particular at least 110 HV (0.001), at least in the surface region of a running surface. By forming the sliding layer with a certain minimum hardness, at least in the surface region, the wear, as a factor limiting the lifespan, of the sliding bearing can be reduced. In contrast to conventional sliding bearing systems for wind turbines, in which it is assumed that a soft bearing material has to be used in order to cope with the mixed friction and the elastic deformation during operation of the wind turbine, which leads to correspondingly large dimensions and hydrodynamic losses, it has become apparent that it is advantageous for the application of a multi-layer sliding bearing according to the invention if correspondingly hard surface materials are used.

In particular, it may be provided that the sliding surface of the sliding bearing element and the sealing surface of the seal have a similar design.

Preferably, the sliding surface of the sliding bearing element and/or the sealing surface comprises a material that is selected from a group comprising aluminum base alloys, bismuth base alloys, silver base alloys, anti-friction varnishes. Particularly these wear resistant and tribologically particularly effective materials have proven particularly advantageous in wind turbines with a high power density. Surprisingly, anti-friction varnishes in particular can be used well as a sliding layer although they have a Vickers hardness of about 25 HV (0.001) to 60 HV (0.001), meaning they are significantly softer than previously described sliding layers, wherein here, increasing the hardness by adding corresponding hard particles is possible.

Moreover, it is possible that a polymer-based running-in layer is arranged on the sliding surface of the sliding bearing element and/or of the sealing surface, in order to thereby achieve a better adaptability of the sealing surface to the sealing element during the running-in of the sealing element.

The materials used as anti-friction varnishes may, for example be polytetrafluoroethylene, resins containing fluorine such as perfluoroalkoxy copolymers, polyfluoroalkoxy-polytetrafluoroethylene copolymers, ethylene tetrafluoroethylene, polychlorotrifluoroethylene, fluorous ethylene-propylene copolymers, polyvinyl fluoride, polyvinylidene fluoride, alternating copolymers, static copolymers such as fluorinated ethylene propylene, polyesterimides, bismaleimides, polyimide resins such as carborane imides, aromatic polyimide resins, hydrogenfree polyimide resins, polytriazopyromellithimides, polyamideimides, in particular aromatic ones, polyaryletherimides, possibly modified with isocyanates, polyetherimides, possible modified with isocyanates, epoxy resins, epoxy resin esters, phenolic resins, polyamide 6, polyamide 66, polyoxymethylene, silicones, polyaryl ethers, polyaryl ketones, polyaryletherketones, polyaryleether-etherketones, polyetheretherketones, polyether ketones, polyvinylidene difluorides, polyethylensulfides, allylene sulfides, polytriazo-pyromellithimides, polyesterimides, polyarylsulfides, polyvinylenesulfides, polyphenylene sulfide, polysulfones, polyethersulfones, polyarylsulfones, polyaryloxides, polyarylsufides as well as copolymers thereof.

Moreover, it may be provided that the sliding bearing element comprises a polymer layer on its sliding surface, wherein the polymer layer has solid lubricant particles and metal oxide particles and as a polymer only a polyimide polymer or a polyamide-imide polymer or a mixture thereof, wherein the metal oxide particles are selected from a group comprising bismuth vanadates, chromium-antimony-rutile and mixtures thereof. It has surprisingly become apparent that polymers with imide groups as one of the essential structural features show an unforeseeable improvement with regard to the wear and the reduction of the nicking tendency if a bismuth vanadate or a chromium-antimony-rutile or a mixture thereof is used as a metal oxide particle. It is assumed that this can be ascribed to the fact that due to the reactivity of the imide groups caused by the two oxygen atoms of the polymer forming the polymer layer, which oxygen atoms neighbor the nitrogen atom, and the charge shifting in the polymer chain caused thereby, the inclusion of the bismuth vanadate and/or the chromium-antimony-rutile is improved via their anionic and/or cationic charge carriers, whereby the polymer matrix is reinforced to an unexpected extent. Thus, not only the formation of a running-in layer, as it is known from the prior art, is possible, but it is also possible for the sliding layer itself made from the polymer layer, which sliding layer contacts the respective sliding partner after the running-in in the normal operation of the sliding bearing element, to be produced for special, high-load applications of a sliding bearing element. In particular, surprisingly good dry running properties can be achieved by the design described above, which properties are essential for maintaining a long service life in hydrodynamic sliding bearings.

According to an embodiment variant of the sliding bearing elements, it is preferably provided that the metal oxide particles are included in a total proportion, which is selected from a range of 2 wt. % to 13 wt. %, in the polymer layer. In the course of the performed tests, it became apparent that while an improvement of the tribological properties of the polymer layer could be observed with a proportion of less than 2 wt. % of said metal oxide particles, the continuous resilience of the polymer layer can be significantly improved starting at a proportion of 2 wt. %, whereby polymer layers with these minimum proportions of metal oxide particles are better suited for the use as a sliding layer of a sliding bearing. On the other hand, the load capacity of the polymer layer decreases at a proportion over 13 wt. % to an extent that negatively influences the use of the polymer layer as a sliding layer.

Moreover, it may be provided that the bismuth vanadate contains oxidic admixtures of tungsten and/or molybdenum. Both metals are also found in typical solid lubricants like MoS2 or WS2, which are known to be used in such polymer layers in sliding bearings. This does not only allow improving the inclusion the metal oxide particles in the polymer matrix but also allows improving the material compatibility with regard to the solid lubricant particles used. In addition to this, however, the lubricity of the polymer layer can be improved in so far as with the increased temperatures during the operation of the sliding bearing element, solid lubricant particles can in turn possibly be formed from these admixtures themselves with the sulfidic constituents of the lubricating oil.

According to a further embodiment variant in this regard, it may be provided that the total amount of tungsten oxide(s) and/or molybdenum oxide(s) in the bismuth vanadate is selected from a range of 5 wt. % to 20 wt. %. At a proportion of less than 5 wt. %, a certain improvement of the tribological properties of the polymer layer could be achieved, however, to an extent which cannot economically justify the use of bismuth vanadate with these admixtures. At a proportion of more than 20 wt. %, no further improvement of the tribological properties of the polymer layer could be observed.

The proportion of antimony oxide(s) in the chromium-antimony-rutile is preferably selected from a range of 5 wt. % to 14 wt. %. Using antimony oxides for reinforcing the polymer matrix is known from the prior art. Antimony ions being added to the rutile cause a charge distortion within the rutile structure, whereby the inclusion of the metal oxide particles in the polymer matrix can be improved. With quantitative proportions of antimony oxide(s) in the chromium-antimony-rutile outside the mentioned range, either only a minor improvement of the tribological properties of the polymer layer could be observed compared to polymer layers with pure TiO2 (with lower proportions), or the polymer layer became too hard (with higher proportions).

It can moreover be provided that the proportion of chromium oxide(s) in the chromium-antimony-rutile is selected from a range of 1 wt. % to 8 wt. %. Using chromium oxides for reinforcing the polymer matrix is also known from the prior art. However, as an oxidic admixture to rutile, surprisingly, a significant improvement of this effect is observed, which exceeds that which would be to be expected by adding only chromium oxides. It is assumed that this increase of the effect is also a result of the better inclusion of the oxidic admixtures of chromium in the polymer matrix, whereby the reinforcing of the polymer matrix has a more immediate effect on the polymer chains. Similarly to what has been described above regarding molybdenum and tungsten, the effect of the oxidic admixtures of chromium was observed below 1 wt. %, but to an extent which favors the addition of pure rutile without the oxidic admixtures of chromium. With a proportion of more than 8 wt. % of these admixtures, the polymer matrix becomes too hard, which makes the entire tribology of the sliding bearing element suffer.

Preferably, the Sb5+ ions and the Cr2+ ions occupy the lattice sites of Ti3+ at more than 50 at. % of the total proportion of chromium and antimony in the chromium-antimony-rutile and thus partly replace the Ti3+. As is known, the idealized rutile structure has exclusively octahedrally coordinated titanium atoms. This idealized structure is characterized by Ti4+ ions and O2 ions. In the real structure of rutile, however, Ti3+ and Ti5+ occurs, too, for example as a result of surface defects. An advantage of more than 50 at. % of the Ti3+ sites being occupied by chromium and antimony, in this regard, is that evidently an improved binding of the chromium-antimony-rutile to the polymer structure can take place at such lattice sites.

Moreover, it may be provided that the antimony and the chromium in the chromium-antimony-rutile are in a ratio relative to one another selected from a range of 1.5:1 to 3:1. The exact mechanism of the effect, however, has not yet been fully clarified. In tests, however, this mixing ratio has proven particularly advantageous.

According to a different embodiment variant of the sliding bearing element, it may be provided that a proportion of at least 60% of the metal oxide particles—in relation to the total proportion of the metal oxide particles in the polymer layer—have a maximum particle size not exceeding 500 nm. Although it is possible to use the metal oxide particles with a conventional particle size for the present technical field for reinforcing the polymer matrix, it was found that using metal oxide particles with a maximum particle size of 500 nm has the advantage that they influence the orientation of the polymer chains in their environment and thus the structure of the polymer itself. Therefore, in addition to their direct effect for reinforcing the polymer matrix, the metal oxide particles also have an indirect effect on the structure of the polymer. Thereby, the strength of the polymer can be changed in a targeted manner.

It can moreover be provided that at least part of the metal oxide particles and/or of the solid lubricant particles have a surface modification. By this surface modification, the interaction of the particles and the polymer matrix, and thus its effect within the polymer layer, can be influenced and adjusted over large areas.

Preferably, the surface modification is selected in this regard from a group comprising silanizations, siloxations, epoxidation, aminations, plasma activations, electron beam activation.

Particularly the functional groups and/or ligands created by these reactions on the surface of the particles have the advantage that the particles can hence be added more easily for producing the polymer layer without agglomeration of the starting materials, whereby the at least approximately homogeneous distribution of the particles in the mixture and consequently in the polymer layer can be improved. By this at least approximately homogeneous distribution of the particles, their effect in the polymer layer can be made consistent. Additionally, this also helps improve the binding of the particles to the polymer matrix.

According to an embodiment variant of the sliding bearing element, the polymer layer preferably consists solely of polyamideimide, solid lubricant particles and the metal oxide particles, whereby the production of the polymer layer can be simplified. In addition to this, possibly occurring interactions between the contents of the polymer layer, which were added to the precursor of the polymer can be reduced, whereby the effectiveness of the contents in the direction of the sliding partner to be borne can be improved.

With regard to the reinforcing of the polymer matrix, it has moreover proven advantageous if the proportion of solid lubricant particles to the proportion of metal oxide particles is selected from a range of 5:1 to 12:1.

In the preferred embodiment variant of the polymer layer, it is designed as a sliding layer, so that the bearing element does not require a further, metallic sliding layer and can thus be constructed more simply.

Moreover, it may be useful if the sealing element is designed as an axial seal, which is arranged between a front side of the nacelle housing and a front side of the rotor hub.

In an alternative, it may be provided that the sealing element is designed as a radial seal, which is arranged between the nacelle housing and the rotor hub and/or between the nacelle housing and the rotor shaft.

In addition to this, it may be provided that the sealing element is designed as a mechanical end-face seal. Particularly by means of a mechanical end-face seal, a good sealing effect for sealing the nacelle can be achieved.

A design according to which it may be provided that the sealing element comprises at least two segments, which can be put over the rotor shaft in the radial direction, is also advantageous. This entails the advantage that the sealing element can be replaced easily without having to remove the rotor shaft. This facilitation of the maintenance of the rotor shaft can be achieved in particular by the sealing element not being closed entirely but rather having a segmented design and thus being able to be opened to allow putting it radially over the shaft.

According to an advancement, it is possible that the sealing element is designed as a labyrinth seal. A labyrinth seal, in particular, can have a long lifespan in the present case of application and have a sufficient sealing effect particularly when the sealing element is not immersed in the lubricating oil sump.

Furthermore, it may be useful if the labyrinth seal has a return line, which leads into the lubricating oil sump. By this measure, an undesired lubricant leakage out of the nacelle can be mostly avoided. The return line may, for example, be realized in the form of a bore, which leads from a dip of the sealing labyrinth in the direction of the lubricating oil sump. However, the return line may also be formed by an inner wall at the labyrinth located closer to the lubricating oil sump being lower than an outer wall at the labyrinth located further away from the lubricating oil sump.

In addition to this, it may be provided that the sealing element is accommodated in the nacelle housing, and the rotor hub is rotatable relative to the sealing element. Particularly a seal formed in such a way and/or an installation situation of the seal formed in such a way leads to the lowest possible wear of the sealing element. Hence, the durability of the sealing element can be increased.

Moreover, it may be provided that the sealing element contacts a sealing surface, which is movable relative to the sealing element, wherein the sealing surface has a sliding lacquer coating. Particularly in such a design of the sealing element, the durability of the wind turbine can be increased.

According to a particular design, it is possible that a sliding sleeve is arranged on the rotor hub or on the rotor shaft, which sliding sleeve cooperates with the sealing element. Particularly when using a sliding sleeve, the durability of the sealing element can be increased.

According to an advantageous advancement, it may be provided that an oil drip element in the form of a plunge-cut groove or of an elevation is formed on the rotor shaft. By these measures, it can be achieved that the sealing effect of the sealing element can be improved.

In particular, it may be advantageous if two sealing elements are formed so as to be axially spaced apart from each other. Hence, the lubricating oil sump can be sealed on both sides, when viewed in the axial direction of the axis of rotation, in order to prevent a leakage of lubricating oil out of the nacelle on one side, and to bind the lubricating oil in the nacelle housing in the region of the lubricating oil sump on the second side.

Furthermore, it may be provided that a sealing element is formed between the nacelle housing and the rotor hub and/or between the nacelle housing and a rotor shaft.

A pressure-increasing device within the meaning of this document is a device, which is configured to increase the pressure of the lubricating oil by means of external energy input. Such a pressure-increasing device is, for example, a hydraulic pump.

In addition to a nacelle housing, a nacelle within the meaning of this document also comprises a rotor hub and a rotor bearing for bearing the rotor hub.

The inner ring element and/or the outer ring element can each be formed as independent components, which may be coupled with the rotor hub or rotor shaft and/or with the nacelle housing. In the alternative to this, it is also conceivable that the inner ring element is formed as an integral element of the rotor hub and/or the rotor shaft. In the alternative to this, it is also conceivable that the outer ring element is formed as an integral element of the rotor hub and/or the rotor shaft. In the alternative to this, it is also conceivable that the inner ring element is formed as an integral element of the nacelle housing. In the alternative to this, it is also conceivable that the outer ring element is formed as an integral element of the nacelle housing.

For the purpose of better understanding of the invention, it will be elucidated in more detail by means of the figures below.

Figure 2:
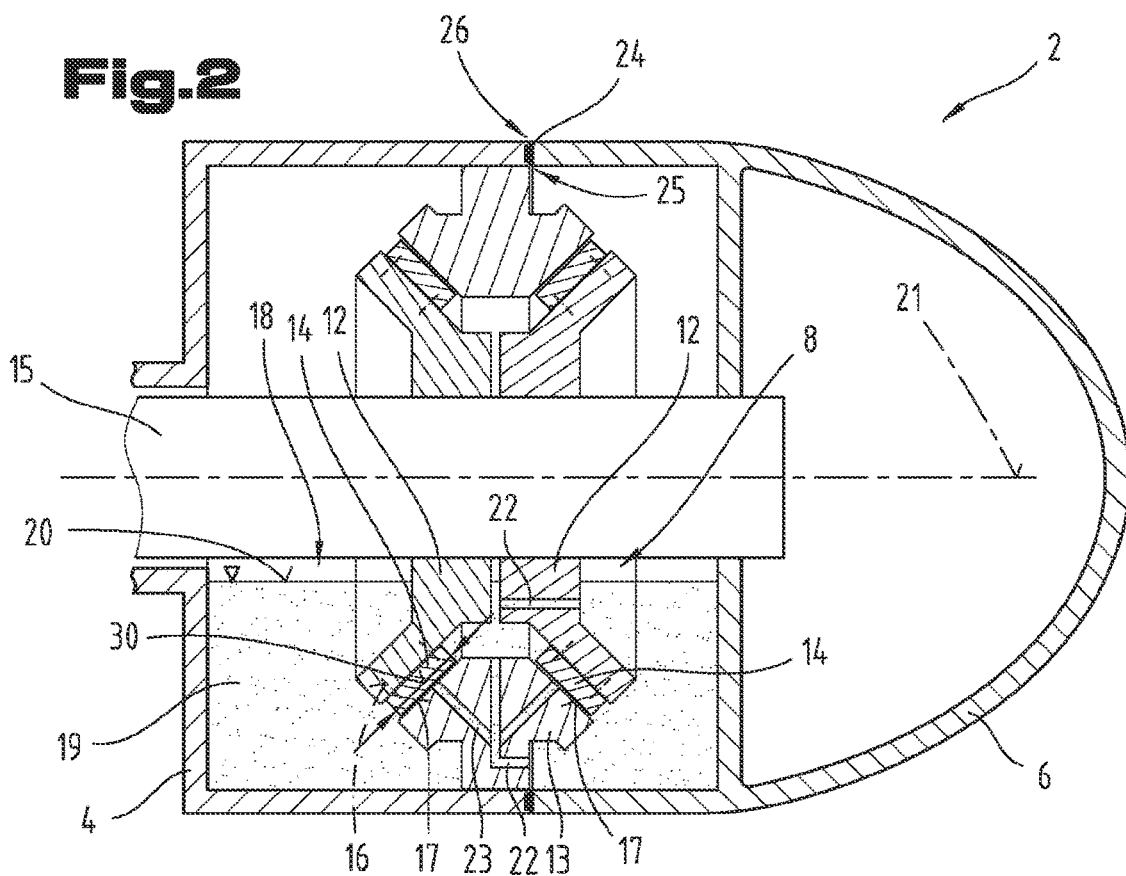
Figure 3:
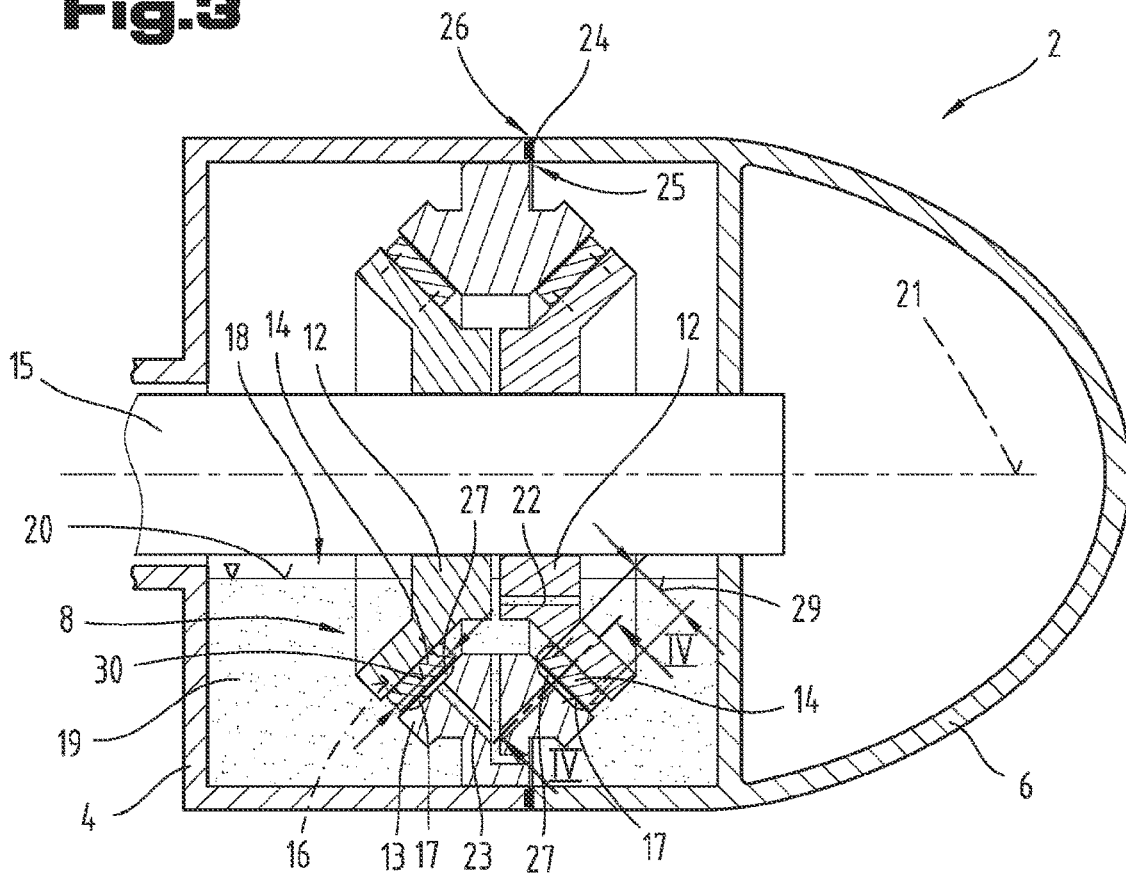
Figure 4:
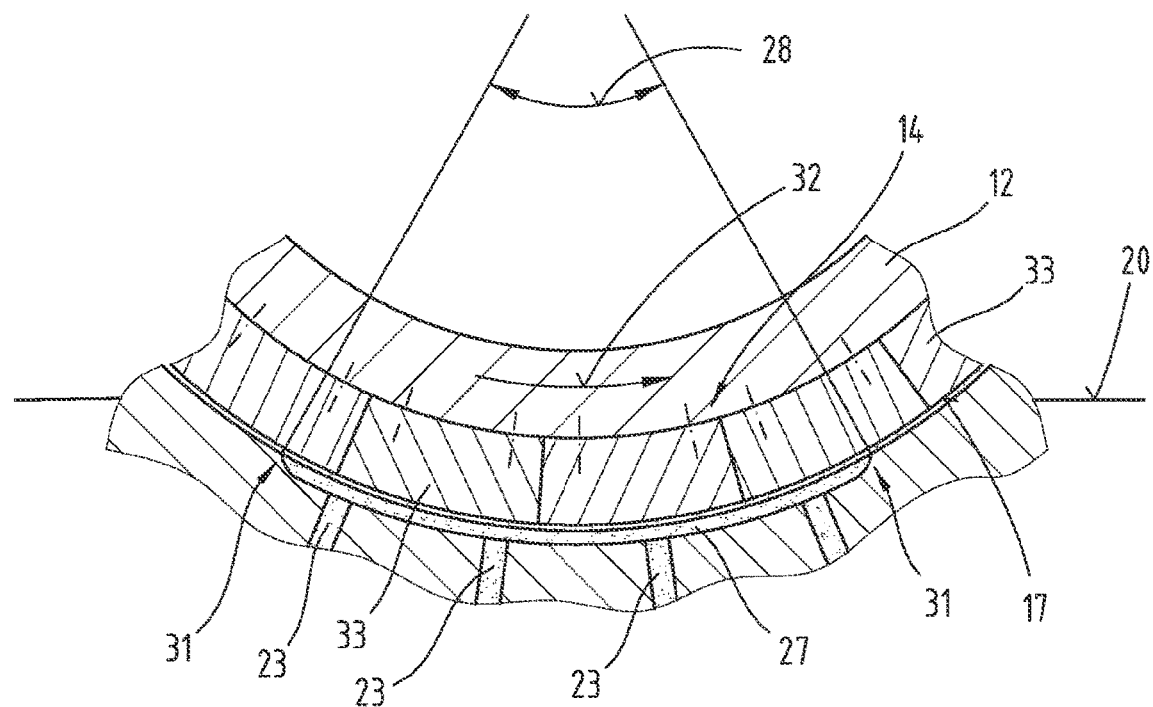
Figure 5:
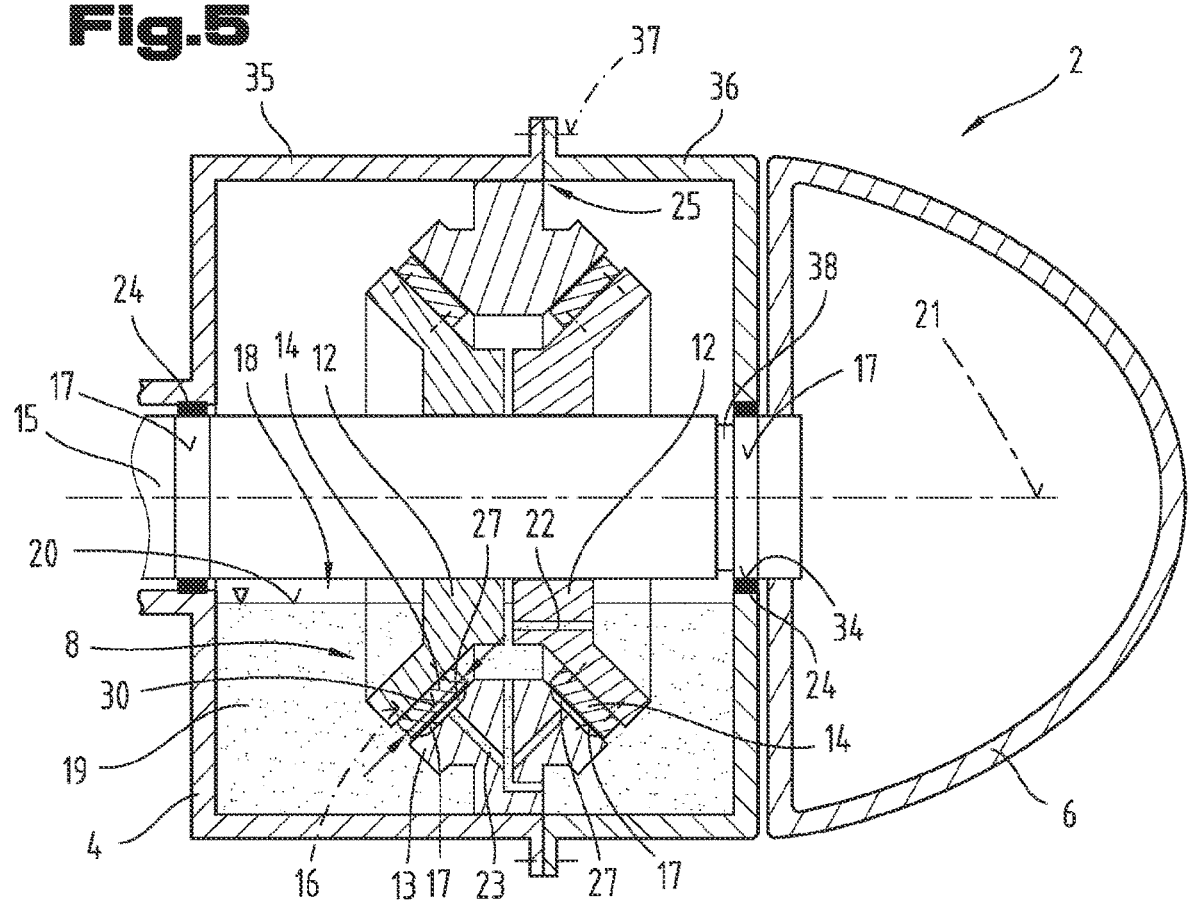
Figure 6:
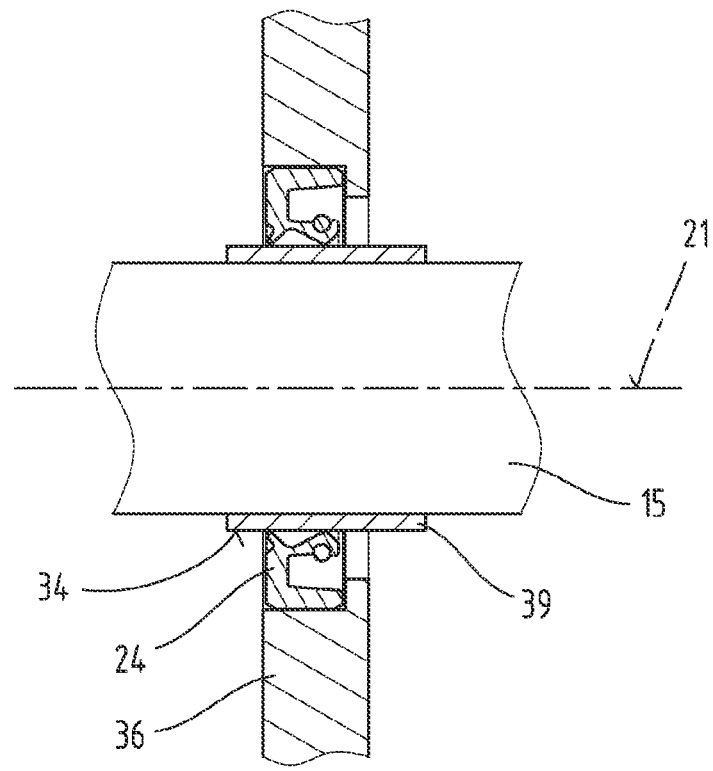
Figure 7:
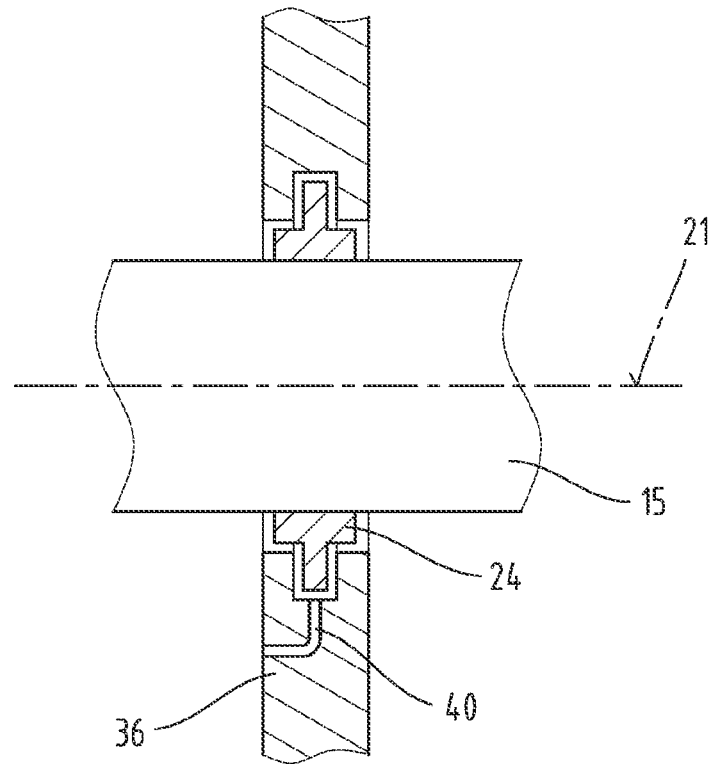

These show in a respectively very simplified schematic representation:

FIG. 1 a schematic representation of a wind turbine;

FIG. 2 a cross-section of a nacelle in a very schematic representation;

FIG. 3 a cross-section of the nacelle with a flow channel in the outer ring element;

FIG. 4 a sectional view of the outer ring element with the flow channel;

FIG. 5 a cross-section of a nacelle with a parted nacelle housing in a very schematic representation;

FIG. 6 an exemplary embodiment of a mechanical seal with a sliding surface formed on a sleeve;

FIG. 7 an exemplary embodiment of a labyrinth seal with an oil drain.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14 is arranged between the inner ring element 12 and the outer ring element 13.

As can be seen from FIG. 2, it may be provided that the inner ring element 12 is coupled with the rotor hub 6. In particular, it may be provided that a rotor shaft 15 is formed, on which the rotor hub 6 is arranged. The inner ring element 12 can be received directly on the rotor shaft 15.

In a further exemplary embodiment that is not depicted, it may of course also be provided that the inner ring element 12 is received directly on the rotor hub 6.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14 are each formed so as to be spaced apart from each other on the V-shaped flank between the two ring elements 12, 13, which sliding bearing elements 14 are arranged at an angle to one another. As can be seen from FIG. 2, an exemplary embodiment may provide that the sliding bearing elements 14 are fastened to the inner ring element 12 by means of a fastening means 16. Hence, a sliding surface 17 may be formed between the sliding bearing elements 14 and the outer ring element 13. In an arrangement of the sliding bearing elements 14 as it is shown in FIG. 2, the sliding surfaces 17 may also be arranged in a V-shape.

As can also be seen from FIG. 2, it may be provided that the inner ring element 12 is designed to be parted with regard to its axial extension, in order to make the assembly of the rotor bearing 8 easier.

In an exemplary embodiment that is not depicted, it is of course also conceivable that the inner ring element 12 does not form a groove as shown in the exemplary embodiment of FIG. 2, but rather that the V-shaped arrangement has a reverse formation, so that a V-shaped projection is formed on the inner ring element 12. In this case, it may be provided for the purpose of an easier assembly that the outer ring element 13 is designed to be parted in its axial extension.

Both in a design with an inner ring element 12 partible in the axial extension and in a design with an outer ring element 13 partible in the axial extension, it may be provided that the individual parts of the respective partibly designed ring element 12, 13 are formed so as to be axially adjustable relative to one another, in order to be able to compensate for example the wear of the sliding bearing elements 14. In particular, it may be provided that due to the axial adjustability of the individual parts of the ring elements 12, 13 relative to one another, the bearing gap can be adjusted.

As can further be seen from FIG. 2, it is provided that a lubricating oil sump 18 is formed, which serves for receiving lubricating oil 19. In the operating state, the lubricating oil sump 18 is filled with lubricating oil 19 up to a lubricating oil level 20. In this regard, the lubricating oil level 20 is selected such that the sliding surfaces 17 are at least partially below the lubricating oil level 20 and thus are immersed in the lubricating oil 19 situated in the lubricating oil sump 18.

The sliding bearing elements 14 are designed as hydrodynamic sliding bearings, whereby a lubricating oil film forms on the sliding surface 17 when the rotor hub 6 rotates about a rotor axis 21, which lubricating oil film serves the hydrodynamic bearing of the sliding bearing element 14.

For introducing lubricating oil 19 to the sliding surface 17, it may be provided that lubricating oil bores 22 are formed in the inner ring element 12 and/or in the outer ring element 13, which lubricating oil bores 22, depending on the rotation position of the rotor hub 6, open into the lubricating oil sump 18 at a first longitudinal end and end into an intermediate space between the inner ring element 12 and the outer ring element 13 at their second longitudinal end. By this measure, it can be achieved that sufficient lubricating oil 19 can be introduced to the sliding bearing element 14.

Moreover, it is also possible for lubricating oil bores 23 to be provided which open directly into the sliding surface 17. By means of these lubricating oil bores 23, the sliding surface 17 can be fluidically connected directly to the lubricating oil sump 18, so that sufficient lubricating oil 19 can be introduced to the sliding surface 17. In particular, it may be provided that due to the movement of the sliding bearing element 14 relative to the outer ring element 13, lubricating oil 19 is sucked into the sliding surface 17 via the lubricating oil bore 23 and/or the lubricating oil bore 22 and there, a lubricating oil film for the lubrication and/or bearing of the sliding bearing element 14 is formed.

In order to achieve a good lubricating effect of the sliding bearing element 14, it may be provided that, as shown in FIG. 2, at least a section of the sliding surface 17, with regard to its width, is situated entirely below the lubricating oil level 20.

Moreover, it may be provided that a sealing element 24 is formed, which serves to seal the rotor hub 6 from the nacelle housing 4. As can be seen from FIG. 2, it may be provided that the sealing element 24 acts between a front side 25 of the nacelle housing 4 and between a front side 26 of the rotor hub 6. In particular, it may be provided that the lubricating oil sump 18 extends over both the nacelle housing 4 and the rotor hub 6 and thus, the sealing element 24 is situated below the lubricating oil level 20 at least in some sections.

As can further be seen from FIG. 2, it may be provided that the sealing element 24 is accommodated in the nacelle housing 4.

FIG. 3 shows a further and possibly independent embodiment of the nacelle 2, wherein again, equal reference numbers and/or component designations are used for equal parts as in FIGS. 1 through 2 above. In order to avoid unnecessary repetitions, it is pointed to/reference is made to the detailed description in FIGS. 1 through 2 preceding it.

As can be seen from FIG. 3, it may be provided that a flow channel 27 is formed in the outer ring element 13, which flow channel 27 is fluidically connected to the lubricating oil bores 23 and serves the improved distribution of lubricating oil 19 in the sliding surface 17.

FIG. 4 shows a sectional view according to section line IV-IV in FIG. 3. As can be seen from FIG. 4, it may be provided that the flow channel 27 extends over a flow channel angle 28, which is preferably selected such that the flow channel 27 is arranged entirely below the lubricating oil level 20. In particular, it may be provided that the flow channel angle 28 is between 10° and 160°, preferably between 45° and 80°.

Moreover, it is provided that a flow channel width 29 is selected such that it is smaller than a width 30 of the sliding bearing element 14. As can be seen from FIG. 4, it may be provided that multiple of the lubricating oil bores 23 open into the flow channel 27. Moreover, it may be provided that the flow channel 27 tapers off in the shape of a wedge gap 31. By this measure, a lubrication film can be formed.

In a first exemplary embodiment, it may be provided that the flow channel 27 on both sides in the circumferential direction tapers off in the shape of a wedge gap 31.

In a further exemplary embodiment, it may be provided that, viewed in the main direction of rotation 32, the wedge gap 31 is formed only at the end of the flow channel 27.

As can further be seen from FIG. 4, it may be provided that the sliding bearing element 14 has multiple sliding bearing pads 33, which are arranged on the inner ring element 12 so as to be distributed across the circumference. The sliding bearing pads 33 may in particular be arranged on the inner ring element 12, such that a continuous sliding surface 17 is formed, which can act as a hydrodynamic bearing. In particular, it may be provided that the sliding surface 17 has the shape of a frustum.

FIG. 5 shows a further and possibly independent embodiment of the nacelle 2, wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

As can be seen from FIG. 5, it may be provided that the lubricating oil sump 18 is formed entirely in the nacelle housing 4. In this regard, it may in particular be provided that the sealing elements 24, in particular their sealing surface 34, are situated entirely above the lubricating oil level 20. In order to enable and/or facilitate the assembly and/or the maintenance of a nacelle housing 4 and/or rotor bearing 8 constructed in such a manner, it may be provided that the nacelle housing 4 has a main part of the housing 35 and a lubricating oil sump lid 36. In particular, it may be provided that the main part of the housing 35 and the lubricating oil sump lid 36 delimit the lubricating oil sump 18. In this regard, it may be provided that the lubricating oil sump lid 36 is fastened to the main part of the housing 35 by means of a fastening means 37.

As can be seen from FIG. 5, it may be provided that, one sealing element 24 each is arranged on either side of the lubricating oil sump 18, when viewed in the axial direction of the rotor axis 21. In particular, it may be provided that the sealing elements 24 are formed as a radial seal ring. One of the sealing elements 24 can, in this regard, be arranged in the main part of the housing 35, the second of the sealing elements 24 may be arranged in the lubricating oil sump lid 36.

Moreover, it may be provided that the sealing elements 24 cooperate with the rotor shaft 15. In particular, it may be provided here that the sliding surface 17 is formed on the rotor shaft 15. In particular, it may be provided that for this purpose, the rotor shaft 15 locally has a particularly formed surface, which is formed for example by a sliding lacquer coating. Such a sliding lacquer coating may particularly be provided when using mechanical seals.

Moreover, it may be provided that an oil drip element 38 is formed on the rotor shaft 15, which oil drip element 38 serves to prevent lubricating oil 19 from reaching the sealing element 24 along the rotor shaft 15 in the axial direction. The oil drip element 38 may for example be designed in the form of a plunge-cut groove. In an alternative embodiment variant, it may also be provided that the oil drip element 38 is designed, for example, in the form of a circumferential elevation on the rotor shaft 15.

FIG. 6 shows a further exemplary embodiment of the arrangement of the sealing element 24 in a detailed view. As can be seen from FIG. 6, it may be provided that a sliding sleeve 39 is arranged on the rotor shaft 15, on which sliding sleeve 39 the sealing surface 34 is formed. Such an arrangement may particularly be useful when using mechanical seals.

In a further exemplary embodiment that is not depicted, it may also be provided that the sliding sleeve 39 is received directly on the rotor hub 6, and the sealing element 24 thus serves to seal the rotor hub 6.

FIG. 7 shows a further exemplary embodiment of sealing element 24. As can be seen from FIG. 7, it may be provided that the sealing element 24 is designed in the form of a labyrinth seal, which for example cooperates with the lubricating oil sump lid 36. In particular, it may be provided that a return line 40 is formed, which serves to return the lubricating oil 19 into the lubricating oil sump 18. As can be seen in FIG. 7, the return line may be designed in the form of a bore, which starts at the lowest point of the labyrinth seal and leads into the lubricating oil sump 18.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | wind turbine |
| 2 | nacelle |
| 3 | tower |
| 4 | nacelle housing |
| 5 | rotor |
| 6 | rotor hub |
| 7 | rotor blade |
| 8 | rotor bearing |
| 9 | radial force |
| 10 | axial force |
| 11 | tilting torque |
| 12 | inner ring element |
| 13 | outer ring element |
| 14 | sliding bearing element |
| 15 | rotor shaft |
| 16 | fastening means |
| 17 | sliding surface |
| 18 | lubricating oil sump |
| 19 | lubricating oil |
| 20 | lubricating oil level |
| 21 | rotor axis |
| 22 | lubricating oil bore of the ring element |
| 23 | lubricating oil bore |
| 24 | sealing element |
| 25 | front side of the nacelle housing |
| 26 | front side of the rotor hub |
| 27 | flow channel |
| 28 | flow channel angle |
| 29 | flow channel width |
| 30 | width of the sliding bearing element |
| 31 | wedge gap |
| 32 | main direction of rotation |
| 33 | sliding bearing pad |
| 34 | sealing surface |
| 35 | main part of the housing |
| 36 | lubricating oil sump lid |
| 37 | fastening element |
| 38 | oil drip element |
| 39 | sliding sleeve |
| 40 | return line |

The invention claimed is:

1. A nacelle for a wind turbine, the nacelle comprising:
a nacelle housing;
a rotor hub;
a rotor bearing for bearing the rotor hub on the nacelle housing,
wherein the rotor bearing has at least one inner ring element and at least one outer ring element,
wherein at least one oil-lubricated sliding bearing element is formed between the inner ring element and the outer ring element,
wherein in the nacelle housing and/or in the rotor hub, a lubricating oil sump for receiving a lubricating oil for the sliding bearing element is formed such that the lubricating oil sump can be filled with lubricating oil up to a lubricating oil level,
wherein at least a section of the rotor bearing is arranged in the lubricating oil sump vertically below the lubricating oil level,
wherein the inner ring element is coupled with the rotor hub and wherein the at least one sliding bearing element is fastened to the inner ring element and is rotatable relative to the outer ring element,
wherein a sliding surface is formed between the sliding bearing element and the outer ring element, and
wherein at least one lubricating oil bore is arranged in the outer ring element, which lubricating oil bore, at a first end, opens into the sliding surface and at a second end opens into the lubricating oil sump.

2. The nacelle according to claim 1, wherein the at least one sliding bearing element is designed as a hydrodynamic sliding bearing, which can be lubricated without a pressure-increasing device.

3. The nacelle according to claim 1, wherein at least one lubricating oil bore is arranged in the inner ring element and/or in the outer ring element, which lubricating oil bore opens directly into the lubricating oil sump.

4. The nacelle according to claim 1, wherein a sealing element is formed between the nacelle housing and the rotor hub and/or between the nacelle housing and a rotor shaft.

5. The nacelle according to claim 4, wherein the lubricating oil level is selected at such a height that the sealing element is situated above the lubricating oil level.

6. The nacelle according to claim 1, wherein the lubricating oil sump is formed entirely in the nacelle housing, wherein the nacelle housing is designed so as to be partible in the region of the lubricating oil sump.

7. The nacelle according to claim 6, wherein the nacelle housing has a main part of the housing and a lubricating oil sump lid.

8. The nacelle according to claim 1, wherein a flow channel being circumferential at least in some sections is formed in the outer ring element, which flow channel tapers off in the shape of a wedge gap and into which the at least one lubricating oil bore opens.

9. The nacelle according to claim 8, wherein the at least one lubricating bore comprises multiple lubricating oil bores formed to be distributed across the circumference of the outer ring element, the multiple lubricating oil bores opening into the flow channel.

10. The nacelle according to claim 1, wherein the lubricating oil level is selected at such a height, that at their lowest-situated cross-section, the sliding surfaces of the rotor bearing are situated entirely below the lubricating oil level.

11. The nacelle according to claim 1, wherein the sliding bearing element comprises multiple individual sliding bearing pads, which are arranged distributed across the circumference.

12. The nacelle according to claim 11, wherein the sliding bearing pads are each fastened to the inner ring element or outer ring element by means of at least one fastener.

13. The nacelle according to claim 1, wherein the sliding bearing element comprises a polymer layer, wherein the polymer layer comprises solid lubricant particles and metal oxide particles and as a polymer only a polyimide polymer or a polyamide-imide polymer or a mixture thereof, wherein the metal oxide particles are selected from a group comprising bismuth vanadates, chromium-antimony-rutile and mixtures thereof.

14. A nacelle for a wind turbine, the nacelle comprising:
a nacelle housing;
a rotor hub;
a rotor bearing for bearing the rotor hub on the nacelle housing,
wherein the rotor bearing has at least one inner ring element and at least one outer ring element,
wherein at least one oil-lubricated sliding bearing element is formed between the inner ring element and the outer ring element,
wherein in the nacelle housing and/or in the rotor hub, a lubricating oil sump for receiving a lubricating oil for the sliding bearing element is formed such that the lubricating oil sump can be filled with lubricating oil up to a lubricating oil level,
wherein at least a section of the rotor bearing is arranged in the lubricating oil sump vertically below the lubricating oil level,
wherein the lubricating oil sump is formed entirely in the nacelle housing, and
wherein the nacelle housing is designed so as to be partible in the region of the lubricating oil sump.

15. A nacelle for a wind turbine, the nacelle comprising:
a nacelle housing;
a rotor hub; and
a rotor bearing for bearing the rotor hub on the nacelle housing,
wherein the rotor bearing has at least one inner ring element and at least one outer ring element,
wherein at least one oil-lubricated sliding bearing element is formed between the inner ring element and the outer ring element,
wherein in the rotor hub, a lubricating oil sump for receiving a lubricating oil for the sliding bearing element is formed such that the lubricating oil sump can be filled with lubricating oil up to a lubricating oil level,
wherein at least a section of the rotor bearing is arranged in the lubricating oil sump vertically below the lubricating oil level,
wherein a sliding surface is formed between the sliding bearing element and the outer ring element, and
wherein the sliding surface is immersed in the lubricating oil sump at least in some sections.

* * * * *